W. L. R. EMMET.
ELECTRIC SYSTEM OF SHIP PROPULSION.
APPLICATION FILED MAR. 15, 1916.
1,304,290.
Patented May 20, 1919.
2 SHEETS—SHEET 1.
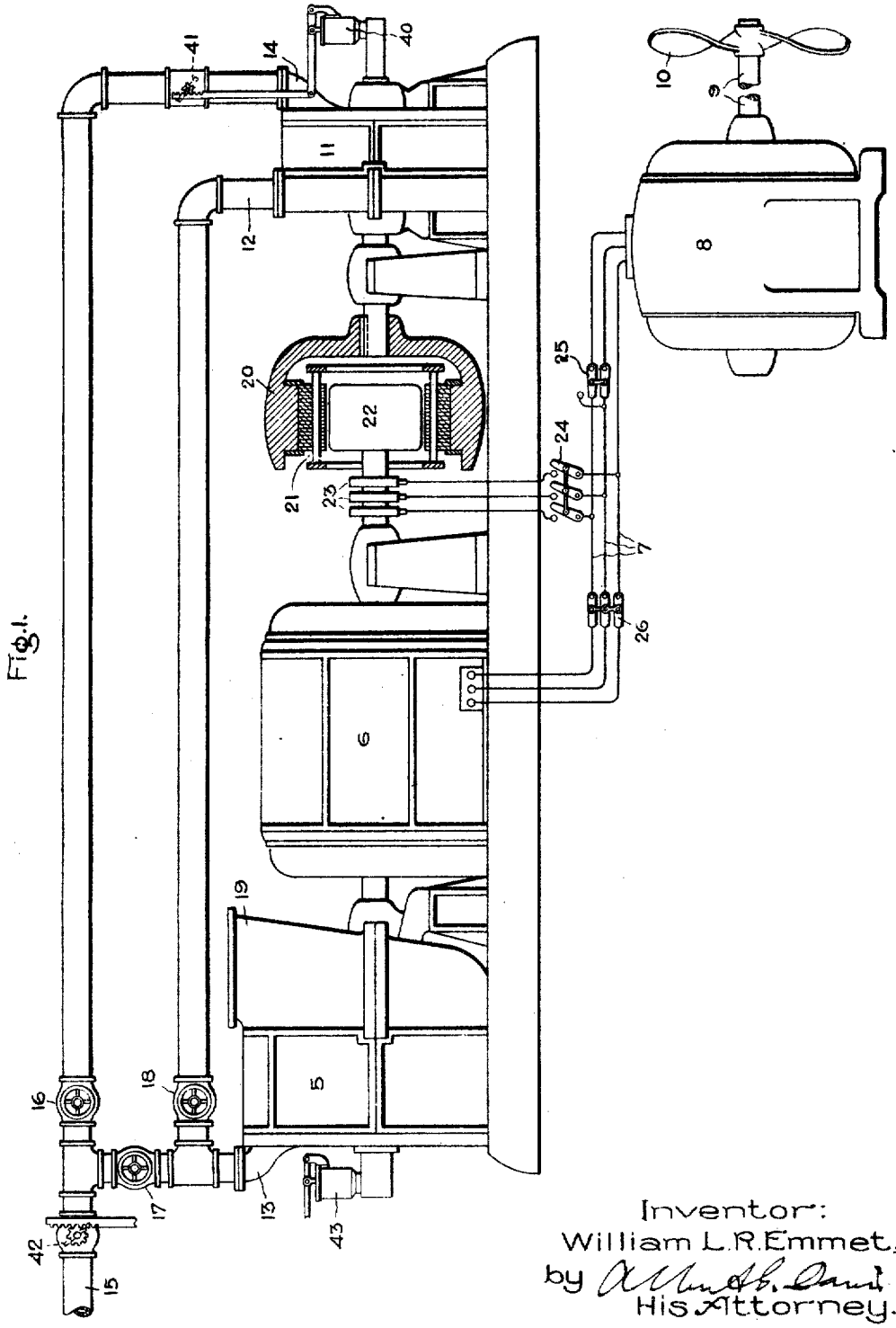
Inventor:
William L. R. Emmet,
by
His Attorney.

W. L. R. EMMET.
ELECTRIC SYSTEM OF SHIP PROPULSION.
APPLICATION FILED MAR. 15, 1916.
1,304,290.
Patented May 20, 1919.
2 SHEETS—SHEET 2.
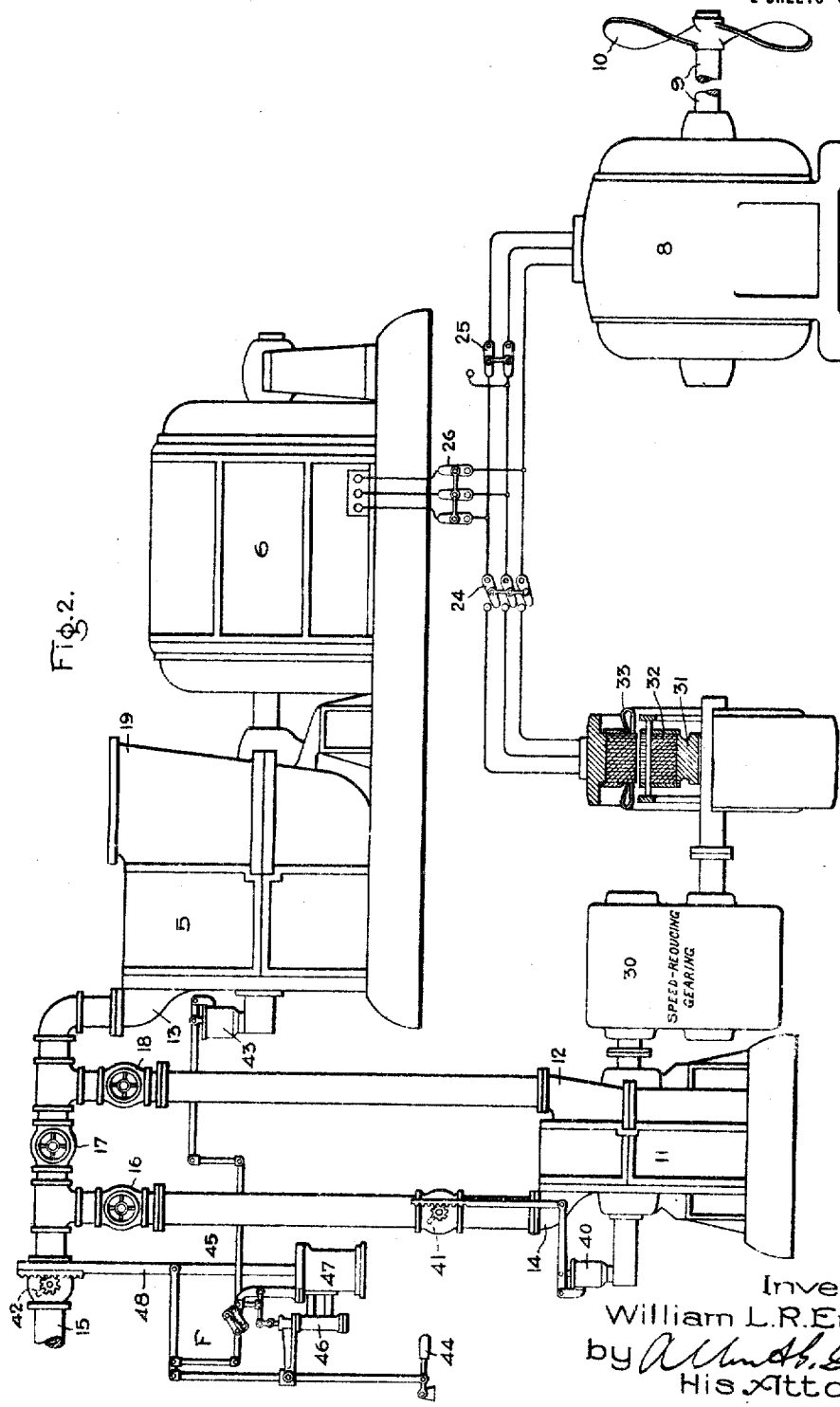
Inventor:
William L. R. Emmet,
by [signature]
His Attorney.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

ELECTRIC SYSTEM OF SHIP PROPULSION.

1,304,290.   Specification of Letters Patent.   Patented May 20, 1919.

Application filed March 15, 1916. Serial No. 84,490.

*To all whom it may concern:*

Be it known that I, WILLIAM L. R. EMMET, a citizen of the United States, residing at Schenectady, in the county of Schenectady, State of New York, have invented certain new and useful Improvements in Electric Systems of Ship Propulsion, of which the following is a specification.

My invention relates to ship propulsion and particularly to systems of ship propulsion in which the ship's propellers are driven by electric motors. The object of the invention is to provide an improved electric system of ship propulsion. Other objects of the invention will be particularly pointed out in the course of the following description.

The system of my present invention is particularly adapted for equipments in which it is necessary that the propelling apparatus operate economically at two different speed ranges. Take, for example, the case of a battleship, where high efficiency at a high range of speeds and at a lower range of speeds is particularly essential, and in fact practically necessary. In such ships, economic operation of the propelling apparatus must be obtained over the desired range of high speeds, including full speed, and also over a suitable range of lower speeds, which I will term the cruising speeds. The present invention more particularly relates to an electric system of ship propulsion in which electric energy is supplied to propeller-driving induction motors by turbine-driven alternators. Speed variations of a ship propelled by such a system can be obtained by varying the admission of operating fluid to the turbines, but efficiency operation over such a wide range of speeds as would include both the high and cruising speeds of the ship cannot be satisfactorily obtained merely by varying the steam admission to the turbines, since if a turbine is designed and proportioned for high efficiency at its high speeds, its efficiency will be much poorer at the relatively low speeds corresponding to the cruising speeds of the ship.

In electric propulsion equipments which I have heretofore proposed for such cases, high efficiency for the higher range of speeds has been obtained by the use of suitable and properly designed alternating current turbo-generators and propeller-driving induction motors, and economy at the lower range of speeds has been provided by changing the connections of the propeller-driving motors so as to provide a different number of primary poles and consequently a different speed ratio between the motors and generator for cruising speeds. Such a change of pole connections enables the generator to be speeded up under cruising conditions instead of operating at the reduced speeds which would be necessary if such a change of speed ratio between the motors and generator were not made. While the speeding up of the turbine improves its action, it involves certain disadvantages, since the friction, windage, and other rotation losses of the turbine are thus made high in proportion to the small output required at cruising speeds. The turbine, furthermore, not being proportioned for such small outputs, works at a disadvantage at cruising speeds in spite of the fact that its speed may be made suitably high by pole-changing of the propeller-driving motors.

The power required to propel a vessel varies approximately as the cube of her speed, and, accordingly, at cruising speeds considerably less than the maximum power of the propelling equipment is required for driving the ship, and greater economy could be obtained by using a small high pressure turbine operating at a higher speed in series with the main turbine, which latter in such a case would be used as a low pressure turbine. The difficulty in practically employing such a system lies in the fact that the full speed of the main turbine is so high that a two-pole generator must be used, and, therefore, it is not possible to use a generator of the ordinary kind with the high pressure cruising turbine, since the speed of the latter should be higher than that of the main turbine for this condition of operation. The particular aim of my present invention is to provide a novel arrangement of apparatus in a system in which two turbines are operated in series so that two electric generators driven by the turbines may be economically operated in parallel for the cruising speeds of the ship. More generally, the aim of my present invention is to provide an improved system of electric ship propulsion adapted for efficient operation at two different speed ranges. The arrangement and operation of the system which I have invented for the attainment of these aims will be best understood from the following description taken in conjunction with the accompanying drawings, in which;

Figure 1 is a diagrammatic representation of an electric system of ship propulsion embodying my present invention; and Fig. 2 diagrammatically illustrates a modified arrangement of the propelling apparatus.

Referring first to Fig. 1 of the drawings, there is diagrammatically represented a main elastic fluid turbine 5 designed for high efficiency as a high-speed high-pressure machine and adapted for economic operation at lower speeds when supplied with elastic fluid of lower pressure. The main turbine is directly coupled to an alternating current generator 6. The generator 6 is preferably a polyphase synchronous alternator of the revolving field type. The generator 6 is electrically connected by means of leads 7 to a polyphase induction motor 8. The rotor of the induction motor is mounted on a propeller shaft 9, carrying a propeller 10.

An auxiliary or cruising turbine 11, designed for high efficiency as a high-speed high-pressure machine, has its exhaust 12 connected to the admission 13 of the main turbine 5. The admission 14 of the auxiliary turbine is connected to the main supply pipe 15 communicating with a suitable source of elastic fluid, such for example as the steam boilers of the ship. The main supply pipe 15 is also in communication with the admission 13 of the main turbine 5. Three valves 16, 17, and 18 are shown for controlling the steam admission to the turbines 5 and 11. When valves 16 and 18 are closed and valve 17 open, the main turbine 5 receives steam directly from the boilers and its exhaust 19 may be connected to a suitable condenser as well understood. Under this condition of operation the main turbine will run at high speeds with high efficiency, and variations of the ship's speed over the high speed range can be obtained by varying the steam admission to the turbine, whereby the speed of the turbine and accordingly the frequency of the alternating current energy delivered to the propeller-driving induction motors are correspondingly varied.

In the equipment represented in Fig. 1, the auxiliary turbine 11 is directly coupled to the rotatably mounted field magnet structure 20 of an induction generator. The field winding of the induction generator may be a squirrel cage winding 21 as is well understood. The armature 22 of the induction generator is mounted on the same shaft as the rotors of the main turbine 5 and synchronous generator 6. The armature winding of the induction generator is electrically connected to slip rings 23 which are in turn adapted to be electrically connected by means of suitable conductors and a switch 24 to the leads 7.

The propeller-driving induction motor 8 is mechanically independent of the main and auxiliary turbines, wherefore the propeller 10 is driven by a torque developed entirely by this motor. It will of course be understood that more than one propeller-driving motor may be coupled to each propeller shaft. A reversing switch 25 is provided for reversing the direction of rotation of the propeller-driving motor, and a disconnecting switch 26 is electrically included in the leads 7.

The operation of the system of Fig. 1 is as follows:—For the higher range of speeds, the switch 24 is open and switch 26 is closed, whereby the induction motor 8 is electrically connected to the main generator 6. Valves 16 and 18 are closed while valve 17 is open, thereby admitting high pressure steam to the main turbine 5. The main turbine 5 and generator 6 thus run at their respective high speeds and the frequency of the alternating current energy delivered by the generator 6 to the induction motor 8 is such as to produce the proper propeller speed for high speed navigation of the ship. During this condition of operation the auxiliary turbine 11 is operatively inactive and the armature 22 of the induction generator rotates idly within the overhung field magnet structure 20. Speed variations of the propeller and hence of the ship for this condition of operation can be obtained by controlling the admission of steam to the turbine 5, and for this purpose a valve 42 is included in the supply pipe 15. The valve 42 is designed to be operatively connected to a speed governor 43 on the main turbine 5 and to a suitable speed control lever, as will be more fully described hereinafter.

For the navigation of the ship at the lower range of speeds, such as her cruising speeds, an arrangement of the apparatus is made by which the operating speed of the main turbine 5 is materially reduced, resulting in a corresponding reduction in the frequency of the alternating current energy supplied by the generator 6 to the motor 8, and hence a reduction in the speed of this motor, as will be well understood by those skilled in the art. This condition of operation is obtained by closing the switch 24 and valve 17, and opening valves 16 and 18, whereby the synchronous and induction machines are electrically connected together and high pressure steam is admitted directly to the cruising turbine 11, while the main turbine 5 operates with exhaust steam received from the cruising turbine. The relative speeds of the turbines 5 and 11 will depend upon the design of the synchronous and induction machines, and in particular upon the ratio of the number of poles of these machines. This will perhaps be better understood by considering for the moment the induction machine as a motor supplied with electric energy from the synchronous machine. The induction machine will then run up to a speed slightly below its synchronous speed, which means that the rotatable field magnet structure 20 will rotate at a speed equal to the speed of its rotating primary core 22 plus the synchronous speed of the induction machine minus its slip. The synchronous speed of the induction machine is obviously determined by its number of poles and by the frequency of the alternating current supplied by the synchronous machine, and the frequency of this alternating current is in turn determined by the number of poles of the synchronous machine and the speed of the main turbine 5. If steam is now supplied to the auxiliary turbine 11 until it acts as a prime-mover and drives the rotatable field magnet structure 20, the actual speed of the latter will increase to a value slightly above its synchronous speed plus the speed of the rotating core 22, and consequently the induction machine will cease to act as a motor and will operate as an induction generator receiving its excitation from the synchronous machine. The relative speeds of the two generators is thus determined by their electrical design, and so the relative speeds of the two turbines is likewise established. Assume for the purposes of explanation that the operating speeds of the elements of the two generators are substantially the same, then the auxiliary turbine will run at substantially twice the speed of the main turbine plus the slip of the induction machine. Any other desired speed ratios of the generators and turbines can obviously be obtained by properly designing the electrical apparatus.

For the purposes of explanation I will assume that the design of the apparatus is such that the speed of the main turbine 5 when the apparatus is arranged for cruising speeds is approximately one-half its normal full speed. The frequency of the alternating current energy developed by the synchronous generator 6 is, therefore, substantially one-half what it is when the main turbine operates at its full speed. The frequency of the induction generator is set by the frequency of the synchronous generator, and the two generators deliver electric energy in parallel to the propeller-driving motor or motors. By this arrangement the frequency of the alternating current energy supplied to the induction motor for cruising speeds is substantially one-half that of the energy supplied for high speeds, but at the same time all of the apparatus of the system operates with excellent efficiency for both the high and cruising speeds of the ship.

In the modification of Fig. 2 the induction generator is mechanically coupled, only to the cruising turbine 11. In order to secure the proper operative speeds of the auxiliary turbine and induction generator, speed reducing gearing 30 is employed to connect the auxiliary turbine to the rotor 31 of the induction generator. The speed reducing gearing 30 may be any suitable marine gearing, preferably of the elastic or flexible type. The rotor 31 of the induction generator carries a squirrel cage winding 32. The armature winding 33 of the induction generator is adapted for parallel operation with the synchronous generator 6 just as in the arrangement of Fig. 1. The operation of the apparatus of Fig. 2 is substantially the same as that of Fig. 1. In the arrangement of Fig. 2, however, the induction generator is entirely idle during full speed navigation of the ship, whereas in the arrangement of Fig. 1 the armature 22 of the induction generator always rotates whenever the main turbine runs. Furthermore, the cruising turbine and induction generator combination of Fig. 2 is an independent unit, and can be used in connection with any one of a plurality of main turbo-generating units. Corresponding elements of the systems of Figs. 1 and 2 are designated by the same reference numerals.

The necessity for changing poles in connection with propeller-driving induction motors for a ship introduces a number of complications involving expense and some loss of efficiency. The system of my present invention is very advantageous on this account, since it provides, without pole-changing, two different speed arrangements which for many classes of ships will give a satisfactory range of navigating speeds. Of course if a third range of speeds is desired pole-changing of the propeller-driving motors may be resorted to for the lowest range of speeds, but even in such a case the use of my invention provides the three speed ranges with only one change of pole connections of the motors. The high speed auxiliary or cruising turbine of my present system is designed and proportioned for the cruising condition, and its high efficiency under this condition makes up for any disadvantages in steam action incident to the slowing down of the main turbine. Thus, a high steam economy is attained without any increase in the friction losses previously mentioned.

The ship's speed under either the full or cruising speed condition can be varied by adjustment of the steam admission, thereby varying the speed of the main turbine with the full speed connections and of both turbines with the cruising speed connections. As the speed of the ship is increased from its cruising speed by increasing the steam admission to the auxiliary turbine, the action of the latter becomes less effective and at any desired point the full speed connections can be made by opening switch 24, opening valve 17 and closing valves 16 and 18. This can be advantageously done by gradually opening valve 17, thereby gradually admitting live steam to the main turbine until the back pressure on the auxiliary turbine is such that it is doing little work, whereupon the valves 16 and 18 are closed and the switch 24 is opened.

The auxiliary turbine 11 has a speed limiting device or governor 40 operatively connected to a valve 41 in the steam supply pipe thereof. The governor 40 is designed to limit the speed of the turbine 11, so as to prevent the speed of this turbine rising above a predetermined value. The governor 40 and valve 41 may advantageously be of that type described in my U. S. Letters Patent No. 1,137,593, dated Apr. 27, 1915.

The valve 42, included in the main steam supply pipe 15, is operatively connected to a speed governor 43 of the main turbine 5 and to a speed control lever 44. The apparatus illustrated in Fig. 2 of the drawings for operatively connecting the speed governor 43 and the lever 44 to the valve 42 is of the type described in my U. S. Letters Patent No. 1,137,308, dated Apr. 27, 1915. The lever 44 serves to adjust the fulcrum F of a floating lever 45, thereby adjusting the speed limits of the turbine 5 within which the governor 43 will hold this turbine by its action upon the pilot valve 46 of the hydraulic motor 47. The piston rod 48 of the hydraulic motor 47 is connected to the valve 42 by a rack and pinion.

What I claim as new and desire to secure by Letters Patent of the United States, is:—

1. An electric system of ship propulsion comprising a propeller, an electric motor operatively connected to said propeller, a main alternating current generator adapted to deliver electric energy to said motor, a main elastic fluid turbine coupled to said generator, a second alternating current generator adapted to deliver electric energy to said motor, an auxiliary elastic fluid turbine operatively connected to the second generator, a source of elastic fluid, and means for driving said main turbine by elastic fluid received directly from said source and at the same time preventing the supply of elastic fluid to said auxiliary turbine for high speed navigation of the ship and for driving said auxiliary turbine by elastic fluid received directly from said source and driving said main turbine by the exhaust fluid of said auxiliary turbine for navigating the ship at lower speeds, said second generator being electrically disconnected from said motor for high speed navigation and said two generators being electrically connected to deliver energy in parallel to said motor for navigation of the ship at said lower speeds.

2. An electric system of ship propulsion comprising a propeller, an electric motor operatively connected to said propeller, a main generator adapted to deliver electric energy to said motor, a main elastic fluid turbine coupled to said generator, a second generator adapted to deliver electric energy to said motor, an auxiliary elastic fluid turbine operatively connected to the second generator, and means for supplying elastic fluid directly to said main turbine and for preventing the supply of elastic fluid to said auxiliary turbine for high speed operation of the ship and for supplying elastic fluid directly to said auxiliary turbine and supplying the exhaust fluid of the auxiliary turbine to said main turbine and electrically connecting said generators to deliver energy in parallel to said motor for operating the ship at lower speeds.

3. An electric system of ship propulsion comprising a propeller, an electric motor operatively connected to said propeller, a main alternating current generator adapted to deliver electric energy to said motor, a main elastic fluid turbine coupled to said generator, an induction generator adapted to deliver electric energy to said motor, an auxiliary elastic fluid turbine operatively connected to said induction generator, and means for supplying elastic fluid to said main turbine while the auxiliary turbine remains operatively inactive for high speed navigation of the ship and for supplying the exhaust fluid of said auxiliary turbine to said main turbine and electrically connecting said generators in parallel whereby the main turbine runs at a lower speed than the auxiliary turbine and electric energy is supplied from both generators to said motor for navigating the ship at lower speeds.

4. An electric system of ship propulsion comprising a main elastic fluid turbine, a synchronous generator coupled to said turbine, an induction generator, an auxiliary elastic fluid turbine operatively connected to drive said induction generator, a propeller, an electric motor operatively connected to said propeller and adapted to receive electric energy from each of said generators, and means for operating said main turbine and said synchronous generator at their respective high speeds by admitting elastic fluid directly to the main turbine for high speed navigation of the ship and for operating said main turbine and said synchronous generator at relatively lower speeds by supplying the exhaust fluid of said auxiliary turbine to said main turbine and electrically connecting said generators to deliver energy in parallel to said motor for navigating the ship at relatively lower speeds.

5. In an electrically propelled vessel, a propeller, an electric motor adapted to drive said propeller, a main alternating current generator adapted to deliver energy to said motor, a main elastic fluid turbine coupled to said generator, a second alternating current generator adapted to deliver energy to said motor, an auxiliary elastic fluid turbine operatively connected to said second generator, a source of elastic fluid, means for supplying elastic fluid directly to said main turbine and electrically disconnecting said motor from said second generator for high speed operation of the ship, and means cooperating with said last mentioned means for supplying elastic fluid directly to said auxiliary turbine and supplying the exhaust fluid of the auxiliary turbine to said main turbine for the purpose of affording improved turbine economy at relatively low speeds of the vessel, said generators being electrically connected to deliver energy in parallel to said motor when the auxiliary turbine exhausts into the admission of the main turbine.

6. In an electrically propelled vessel, a propeller, an electric motor adapted to drive said propeller, a main generator adapted to deliver energy to said motor, a main elastic fluid turbine coupled to said generator, a second generator adapted to deliver energy to said motor, both elements of said second generator being rotatably mounted, said main turbine being arranged to drive one element of said second generator, a source of elastic fluid, and an auxiliary turbine operatively connected to the other element of said second generator and adapted to receive elastic fluid from said source and to exhaust into the admission of said main turbine for the purpose of affording improved turbine economy at relatively low speeds of the vessel, said generators being electrically connected to deliver energy in parallel to said motor when the auxiliary turbine exhausts into the admission of the main turbine.

7. In an electrically propelled vessel, a propeller, an electric motor adapted to drive said propeller, a main alternating current generator adapted to deliver energy to said motor, a main elastic fluid turbine coupled to said generator, an induction generator also adapted to deliver energy to said motor, both elements of said induction generator being rotatably mounted, said main turbine being arranged to drive one element of said induction generator, an auxiliary elastic fluid turbine operatively connected to the other element of said second generator, means for supplying elastic fluid directly to said main turbine and electrically disconnecting said motor from said induction generator for navigating the ship at high speeds, and means cooperating with said last mentioned means for supplying elastic fluid directly to said auxiliary turbine and supplying the exhaust fluid of the auxiliary turbine to said main turbine for the purpose of affording improved turbine economy at relatively low speeds of the vessel, said generators being electrically connected to deliver energy in parallel to said motor when the auxiliary turbine exhausts into the admission of the main turbine.

8. An electric system of ship propulsion comprising a main elastic fluid turbine, an alternating current generator coupled to said turbine, an auxiliary elastic fluid turbine, means for supplying the exhaust fluid of said auxiliary turbine to the admission of said main turbine, a second alternating current generator operatively connected to said auxiliary turbine, a propeller mechanically independent of said turbines and adapted to be driven by an electric motor or motors, an electric motor operatively connected to said propeller, said generators being adapted to deliver electric energy in parallel to said motor when the auxiliary turbine exhausts into the admission of the main turbine, and means for operating said motor with energy supplied entirely by said first mentioned generator.

9. An electric system of ship propulsion comprising a main elastic fluid turbine, a synchronous alternating current generator coupled to said turbine, an auxiliary elastic fluid turbine, means for supplying the exhaust fluid of said auxiliary turbine to the admission of said main turbine, an induction generator operatively connected to said auxiliary turbine, a propeller, an electric motor operatively connected to said propeller, and means for electrically connecting said generators so that they deliver electric energy in parallel to said motor, the two generators being electrically so proportioned as to establish a relation between the turbines whereby the auxiliary turbine operates at a higher speed than the main turbine.

10. An electric system of ship propulsion comprising a main elastic fluid turbine, an alternating current generator coupled to said turbine, an auxiliary elastic fluid turbine, means for supplying the exhaust fluid of said auxiliary turbine to the admission of said main turbine, a second alternating current generator operatively connected to said auxiliary turbine, a propeller, an electric motor operatively connected to said propeller, and means for electrically connecting said generators so that they deliver electric energy in parallel to said motor, the two generators being electrically so proportioned as to establish a relation between the turbines whereby the auxiliary turbine operates at a higher speed than the main turbine.

In witness whereof, I have hereunto set my hand this 14th day of March 1916.

WILLIAM L. R. EMMET.